(No Model.) 2 Sheets—Sheet 1.

I. O. ENDICOTT.
VEHICLE.

No. 262,385. Patented Aug. 8, 1882.

Witnesses
John F. E. Prinkert
Bernice J. Noyes

Inventor:
Israel O. Endicott
by Crosby & Gregory
Attys.

(No Model.)  2 Sheets—Sheet 2.

I. O. ENDICOTT
VEHICLE.

No. 262,385. Patented Aug. 8, 1882.

Witnesses.
John F. C. Brinkert
Dennis J. Noyes.

Inventor:
Israel O. Endicott
by Crosby & Gregory
Atty's.

N. PETERS. Photo-Lithographer. Washington. D. C.

UNITED STATES PATENT OFFICE.

ISRAEL O. ENDICOTT, OF MANCHESTER, NEW HAMPSHIRE.

VEHICLE.

SPECIFICATION forming part of Letters Patent No. 262,385, dated August 8, 1882.

Application filed December 8, 1881. (No model.)

*To all whom it may concern:*

Be it known that I, ISRAEL O. ENDICOTT, of Manchester, county of Hillsborough, State of New Hampshire, have invented an Improvement in Vehicles, of which the following description, in connection with the accompanying drawings, is a specification.

My invention relating to vehicles is embodied in that class of vehicles in which the main frame-work of the vehicle is supported on springs interposed between it and the axle, and has for its object to relieve the said springs of horizontal or tractile strain by transmitting the tractile force through suitable draw-bars from the frame-work to the axles, so that the springs have only to sustain the vertical pressure of the load thereon.

Figure 1:
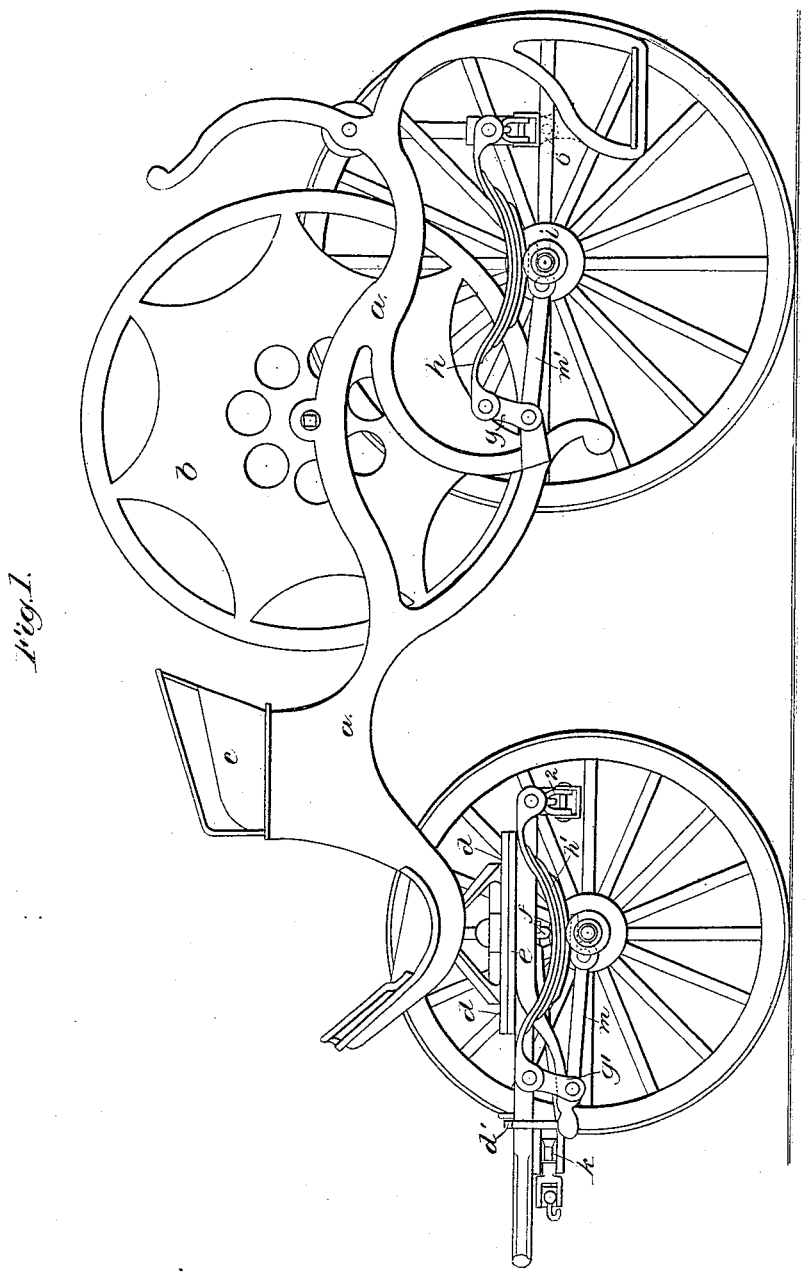
Figure 2:
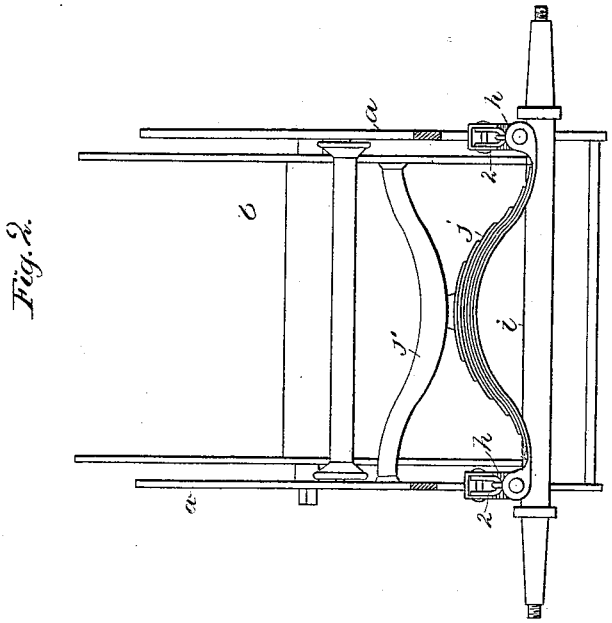
Figure 3:
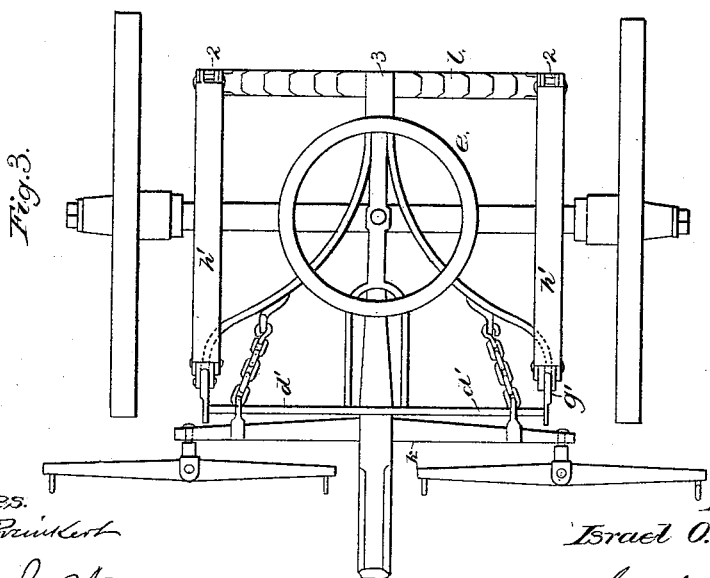

Figure 1 shows in side elevation a hose-carriage provided with this invention, the near wheels being removed to better show the other parts; Fig. 2, a rear elevation thereof; and Fig. 3, a plan view of the platform or fifth-wheel, upon which the forward end of the vehicle-frame is mounted.

The main longitudinal or side frames, $a\ a$, are of suitable form to sustain the load to be carried, consisting in this instance of the hose-reel $b$ and driver's seat $c$, and are connected at their forward end with the circle or rocker-ring $d$, pivoted upon the platform $e$ by the usual center pin or transom, $f$. Each side frame $a$ is supported near its rear end through a swinging link, $g$, upon one end of a semi-elliptical spring, $h$, mounted upon the rear axle, $i$, of the vehicle-wheels, while another point of the frame may be either supported directly upon the other end of the said elliptical spring by another swinging link, as shown in dotted lines at 6, Fig. 1, or may be supported thereon through the intervention of a transverse spring, $j$, connected by shackles 2 with the springs $h$, and supporting a cross-bar, $j'$, connecting the two side frames $a\ a$, as shown in Fig. 2. The tractile force of the horses is transmitted from the whiffletrees and evener-bar $k$ to the frame-work of the platform $e$, and thence through the transom $f$ to the main frame-work $a$ of the vehicle.

The transverse portion $d'$ of the frame-work $d$ is pivotally connected at either end by swinging links $g'$ with one end of each of the semi-elliptical springs $h'$, mounted upon each end of the forward axle-tree, and the rear end of the said frame-work is supported at 3 upon the middle of a transverse spring, $l$, connected by shackles 2 with the other ends of the said springs $h'$. The tractile force applied to the platform $e$ and transmitted therefrom to the frame-work $a$ is transmitted to the axles by the radial draw-bars $m\ m'$, the former of which connects the platform $e$ with the front axle and the latter of which connects the frame-work $a$ with the rear axle, thus transmitting all horizontal forces directly from the said platform and frame-work to the axles, while the vertical force due to the weight sustained is transmitted through the springs, in the usual manner, to the said axles, the said springs thus being subject to vertical strains only, and consequently much more durable and effective than when employed to transmit the tractile force to the axles, as in the case when the draw-bars $m\ m'$ and swinging links $g\ g'$ are omitted and the springs directly connected to the frame-work in the usual manner. The said draw-bars are pivotally connected with the frame-work and axles, and consequently do not interfere with the vertical movement of one relative to the other, and the swinging links or pivotal connection between the springs and frame-work permit the springs to lengthen as the load depresses them and entirely prevents any endwise or horizontal strain on the said springs.

It is obvious that the platform $e$, instead of supporting the forward end of a four-wheeled vehicle, may constitute the frame-work and support the entire load of a two-wheeled vehicle.

I claim—

1. The combination, substantially as shown and described, of the platform $e$, supporting the front end of the vehicle-frame, the side springs $h'$, connected with the platform at their front ends through the links $g'$ and at their rear ends by a cross-spring, $l$, and connecting-links 2, the draw-bars $m$, extending directly from the links $g'$ to the axle, and the draft-connections, to operate as and for the purpose specified.

2. The combination, substantially as shown and described, of the vehicle-frame, the ring $d$, connected therewith, the platform $e$, the connecting bolt $f$, the cross-piece $d'$, the side springs loosely linked to such cross-piece, and connected with a cross-spring at their rear ends by loose joints, draw-bars $m$, and draft-connections, all as and for the purpose specified.

3. The combination of the longitudinal framework $a$, transverse portion $j'$ and axle thereunder, the side springs $h$, mounted on the said axle, the swinging link $g$, the transverse spring connected with the said side springs, and the radial draw-bars pivotally connected with the said side frames and axle, all arranged and to operate substantially as and for the purpose set forth.

In testimony whereof I have signed my name to this specification in the presence two subscribing witnesses.

ISRAEL O. ENDICOTT.

Witnesses:
ROSWELL H. HASSAM,
CHARLES T. MEANS.